Sept. 28, 1937.  A. G. F. WALLGREN  2,094,137
BEARING
Filed Aug. 29, 1933

INVENTOR
August Gunnar Ferdinand Wallgren
BY Wm. T. Hedlund
his ATTORNEY

Patented Sept. 28, 1937

2,094,137

UNITED STATES PATENT OFFICE 2,094,137

BEARING

August Gunnar Ferdinand Wallgren, Stockholm, Sweden, assignor to Aktiebolaget Nomy, Stockholm, Sweden, a corporation of Sweden Application August 29, 1933, Serial No. 687,248
In Great Britain May 8, 1930

7 Claims. (Cl. 308—73)

The present application is a continuation in part with respect to application Serial No. 451,234 filed May 10, 1930, and with respect to all subject-matter common to said application Serial No. 451,234 is to be considered as relating back for all dates and rights incident to the filing thereof and to the filing of corresponding applications in foreign countries.

The present invention relates to bearings and has particular reference to bearings of the type in which a plurality of bearing blocks having bearing surfaces of substantial area are mounted so as to slide in tilted position with respect to a cooperating bearing surface formed on an adjacent bearing member so that wedge-shaped spaces opening in the direction of movement of the bearing blocks are formed, which spaces are filled with load sustaining films of lubricant through which the load is transmitted from the blocks to the adjacent bearing member. More specifically, the invention constitutes an improvement upon the general type of bearing disclosed in Patent No. 1,871,405 granted to me August 16, 1932.

In one of its aspects the present invention has for a principal object the provision of an improved form of bearing of the general character under discussion which will permit full advantage to be taken of the possibilities of this type of bearing for transmitting through a given size of bearing, extremely heavy bearing loads. It is also an object of the invention to provide an improved form of bearing having long useful life when operated under extremely heavy load conditions and under conditions which may require frequent stopping and starting in normal operation.

In another of its aspects the present invention has for a general object a new and improved method of forming a set of bearing blocks for a bearing which permits the maximum load sustaining capabilities of a given bearing to be made available through the precise accuracy with which the several blocks of a given set may be made while at the same time providing bearing blocks having the wear-resisting physical properties required in a bearing of the nature above set forth.

Further and more detailed objects of the invention, together with the manner in which they and the above stated objects are attained, may best be understood from a consideration of the following description of the invention as embodied in one suitable form of bearing, taken in conjunction with the accompanying drawing forming a part of this specification, of which:

Figure 1:
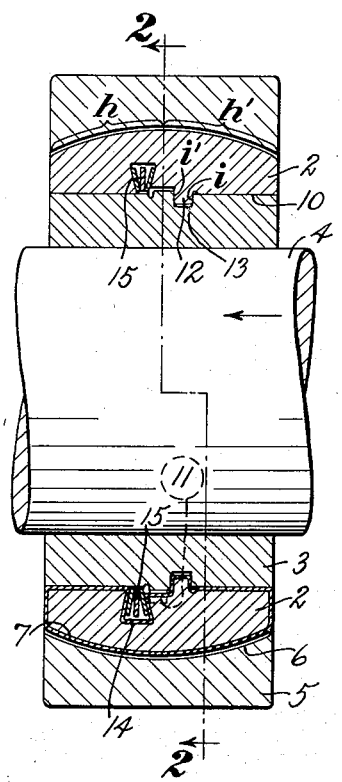
Fig. 1 is a central longitudinal section of a bearing embodying the invention.

For purposes of illustration I have shown a radial bearing of the type adapted to absorb a certain amount of axial or thrust load in addition to the radial load, but it is to be understood that the invention is equally applicable and is productive of like advantages in sliding block bearings of the general type under consideration which may be constructed to transmit radial loads only or which may be constructed to transmit thrust loads only.

Turning now to the drawing, the bearing illustrated comprises a plurality of bearing blocks 2 tiltably mounted with respect to an inner bearing ring 3 adapted to be fixed to shaft 4. An outer or race ring 5 is provided with an inner spherically curved bearing surface 6, with respect to which the outer spherically curved bearing surfaces 7 of the blocks are adapted to slide when the bearing is in operation. The inner ring 3 is provided with a plurality of peripherally spaced axially extending grooves 8 and surfaces 9 (preferably cylindrical) between the grooves, which surfaces adjacent to the edges of the grooves provide bearing shoulders a and b. Centrally of the blocks, the inner faces thereof are provided with axially extending surfaces 10, the edge portions of which c and d are adapted to contact the bearing shoulders a and b respectively for transmitting load between the inner ring and the bearing blocks. In one direction of rotation the surfaces a and c are in contact. In the other direction of rotation, the surfaces b and d are in contact. The inner ring 3 is also provided with a plurality of peripherally spaced, radially extending projections 11 which limit peripheral movement of the blocks with respect to the inner ring while at the same time permitting sufficient peripheral movement of the blocks relative to the inner ring to allow the proper inner bearing surface of each of the blocks to come into cooperative load transmitting relationship with its corresponding shoulder on the bearing ring.

Each of the blocks 2 is provided with an inwardly extending circumferential ridge 12 which projects into a circumferentially extending groove 13 in the inner ring 3, and each of the blocks is also provided with a circumferentially extending groove 14 adapted to receive a plurality of spring or snap rings 15 for holding diametrally opposed blocks in desired relationship with respect to each other and also for removably holding the bearing blocks in assembled position with respect to the inner bearing ring.

In the form of bearing illustrated, the number of rings 15 is half that of the number of blocks and each ring is provided with two pairs of diametrally opposed projections 16 for holding pairs of diametrally opposed blocks so that the blocks can shift only in pairs with respect to the ring 3. The details of construction of the peripherally extending projections 11 and the grooves 13 and 14, and also of the rings 15, may be widely varied, and form per se no part of the present invention. For further disclosure with respect to these features of construction, reference may be had to the following patents: Patent No. 1,920,724, issued August 1, 1933; Patent No. 1,920,726, issued August 1, 1933.

The operation of the bearing is as follows:

Let it be assumed for purposes of illustration that the blocks are in some position peripherally intermediate the projections 11 which limit peripheral movement of the blocks with respect to ring 3.

Figure 2:
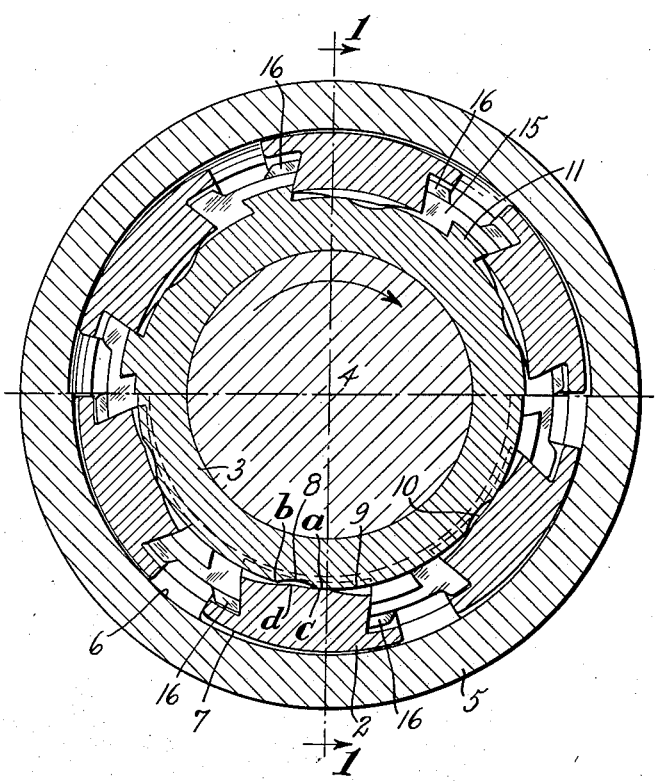
Fig. 2 is a section taken on line 2—2 of Fig. 1.
Figure 3:
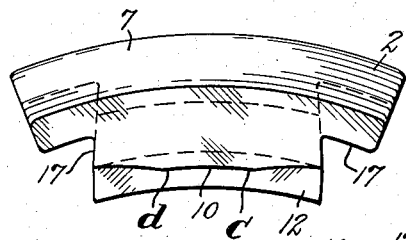
Fig. 3 is a side view on an enlarged scale of one of the bearing blocks shown in Figs. 1 and 2.

Upon rotation of the shaft and inner bearing ring 3 relative to the outer or race ring 5 in the direction indicated by the arrow in Fig. 2, each pair of blocks, as soon as it reaches an unloaded zone of the bearing, shifts peripherally with respect to the inner ring 3 until the blocks are in the position shown in this figure, with the bearing surfaces $c$ in contact with the shoulders $a$ on the inner ring and with the blocks held against further peripheral movement relative to the inner ring by the projections 11 immediately behind the blocks. With the blocks in this position with respect to the inner ring 3, they are assymmetrically loaded and supported and tilt to provide wedge-shaped spaces opening in the direction of rotation. These spaces are filled with lubricant, which provides the load transmitting medium between the blocks and the outer ring.

Upon reversal of direction of rotation of the shaft relative to the outer bearing ring, the pairs of blocks, as soon as they reach an unloaded zone, shift peripherally with respect to ring 3 in clockwise direction as viewed in Fig. 2 to bring the blocks into positions such that surfaces $b$ and $d$ are in contact and with the blocks in contact with the projections 11 behind the blocks when considered in the direction of rotation. In this position the blocks are oppositely tilted from the position shown in Fig. 2, with the wedge-shaped spaces again opening in the direction of rotation in order to provide for the formation of the wedge-shaped load sustaining films of lubricant.

From a consideration of the bearing structure above described, it will be evident that since, in operation, the only relatively sliding surfaces in the bearing provide load transmitting surface of substantial area and since the places of concentrated load, that is, the surfaces $a$—$c$ or $b$—$d$, are stationary with respect to each other, except for a very minute rocking motion as the angle of tilt of the blocks with respect to the outer ring changes with variations in load, the bearing structure is theoretically adapted to transmit extremely high bearing loads and to transmit such loads at high speeds of rotation.

In order to make use of the inherent theoretical capabilities of the bearing, the unit stresses transmitted through the bearing must be relatively high, and in order to utilize the maximum capabilities of the bearing with respect to load carrying capacity and length of life, I have discovered that certain definite physical characteristics of materials and certain combinations of materials in these several elements are essential to obtain the best results because of certain operating characteristics peculiar to this type of bearing.

In order to better understand the problem, let us consider the action of the bearing when it is operated under the very heavy load conditions, the ability of which to sustain constitutes one of the chief advantages of the bearing. When the bearing is at rest, the bearing blocks are not tilted and because of the load supported by the bearing, all or substantially all of the lubricant between the sliding surfaces of the block or blocks which sustain the load when the bearing is rotating may have been squeezed out from between these surfaces and the sliding surface of the outer ring.

A certain amount of movement of the blocks relative to the outer ring 5 is required when the bearing is started to shift the load carrying blocks peripherally with respect to the inner ring to their proper positions if they are out of position peripherally when the bearing is started and, furthermore, a certain amount of rotational movement is required, even if the blocks are in proper peripheral position initially, to form the load sustaining wedge-shaped films of lubricant between the blocks and the outer ring. During this initial period of movement prior to the formation of the load sustaining films, the sliding surfaces may be in substantially metal to metal contact and under these conditions it is evident that unless such conditions are adequately taken care of, unduly rapid wear of the sliding surfaces will occur, particularly in the case of bearings which are not only heavily loaded but frequently started and stopped in normal operation. Also, in addition to what may be termed purely erosive wear, there is likelihood of the sliding surfaces of the blocks or of the ring, or both, becoming scored peripherally of the bearing. Wear, and scoring particularly, must be avoided in the type of bearing under consideration to a greater extent than in journal bearings or in other types of anti-friction bearings because it is essential to long continued operation of the bearing at maximum load sustaining capacity for the load sustaining films to be properly formed and retained between the relatively sliding surfaces. Wear of a nature which tends to alter, even by small amounts, the contours of the relative sliding surfaces from their original contours and peripheral scores which provide channels in any of these surfaces prevent the retention of load sustaining lubricant films of the desired form and load sustaining capabilities in the loaded zone of the bearing, since in normal operation of this type of bearing such films are subjected to unit pressures of a very high order such, for example, as 4500 pounds per square inch.

In order to minimize the possibility of scoring it is desirable to use two different metals for forming the surfaces which slide relative to each other, and it is further desirable to use one metal which is appreciably softer than the other so that any hard impurities larger in size than the thickness of the lubricant film which may get between the surfaces may become embedded in one of the surfaces by pressure exerted by the other and harder surface. It is further desirable, where there is likelihood of metal to metal sliding contact, to make one of the surfaces of a metal which has inherent lubricating qualities. Numerous different relatively soft bearing metals are known which have these qualities but such metals are entirely impractical for a bearing of the present type because of lack of sufficient mechanical strength. Cast iron in certain of its forms also has to some extent the desired properties of relative softness and inherent lubricating ability when dry due to the presence therein of carbon in the form of graphite. However, the conditions of service under which bearings of the type to which the present invention relates must operate are so severe, if full advantage is taken of the capabilities of the bearings, that cast iron of the form heretofore employed for journal bearings and the like is not at all commercially suitable for the present purpose.

To be suitable for bearings of the type to which the present invention relates, a cast iron bearing material must be of an analysis such that it can be cast without forming blow holes or like cavities; it must be of a form providing carbon in graphite form; it must have a relatively high value of hardness for such iron; it must have a sufficiently high modulus of elasticity to prevent undue brittleness; it must be free from so-called "hard spots"; and its metallographic structure must be such that disintegration of the sliding bearing surface will not take place under the peculiar conditions of service occurring with bearings of the sliding block type.

Cast iron, disregarding for the moment special alloys and considering only the ferrous and carbon constituents thereof, may be said to consist of pure iron or ferrite and carbon in free or graphitic form and in the form of an iron carbide $Fe_3C$ known as cementite, which carbide is of extreme hardness. Cementite and ferrite form a mechanically intimate mixture which may be in the form of alternate laminae of some 1/25,000th of an inch thickness or of portions of less well defined form, which mixture is known as pearlite and which is, as compared with cementite, relatively soft, and as compared with pure ferrite, relatively hard.

In order for an iron to be easily cast without blow holes, cavities and the like, and to be used readily for castings of different dimensions and forms without prohibitive loss due to faulty castings, the iron should have relatively high percentages of carbon and silicon such, for example, as total carbon of 3.5% and silicon of 2%. Such iron has, however, inadequate strength for the present purpose, having a low value of Brinell hardness and a low modulus of elasticity. In its ordinary forms, iron of this general analysis will be found to consist of ferrite, free cementite and coarse pearlite, in which the free carbon, that is, the carbon in excess of that existing in the form of the carbide $Fe_3C$ (cementite), is in the form of relatively large or coarse particles or laminae distributed in the pearlitic constituent of the metal.

Such an iron is representative of irons used for cast iron journal bearings and the like and is wholly impractical for the purposes of the present invention for numerous reasons, among which the following are important:

In the first place, if a substantial proportion of the combined carbon is in the form of free cementite, which is, as previously noted, of extreme hardness, the iron will have "hard spots" which will defeat the purpose of making the bearing element of a relatively soft material.

Figure 4:
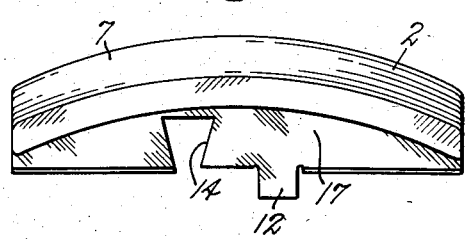
Fig. 4 is an end view of the block shown in Fig. 3.
Figure 5:
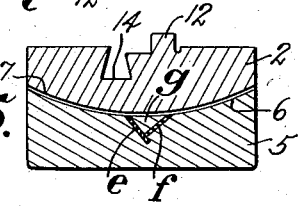
Fig. 5 is a longitudinal section of part of a bearing for illustrating certain difficulties avoided by the present invention.

In the second place, the free graphitic carbon in the form of relatively coarse laminae results in the provision of a structure which cannot resist the conditions of operation to which it is subjected in a sliding block bearing without relatively rapid deterioration of the bearing surface. In order to more clearly explain the peculiar action which takes place and which renders this form of cast iron commercially unsuitable, I have shown at Fig. 5 a section of a bearing ring of this character in which there is shown exaggeratedly at $e$ and $f$ two plates or laminae of graphitic carbon isolating a small grain of ferrous constituent indicated at $g$. The graphitic carbon is more or less porous and can absorb lubricant. In fact, lubricant can be forced into the graphitic carbon without a great deal of difficulty. It is this property of the graphitic carbon in its usual form which, while useful from the standpoint of providing lubrication in a dry bearing, also renders the ordinary forms of graphitic cast irons impractical for use in sliding block bearings. By reference to Fig. 2, it will be evident that, as the bearing blocks pass a given place on the sliding bearing surface of the ring, the given place on the bearing surface is alternately subjected to the pressure of lubricant under extremely high pressure as a bearing block passes over the place and to a pressure which may be assumed to be as low as atmospheric during the interval between the passage of adjacent blocks. In the bearing illustrated there are six blocks. There may be more. With the bearing rotating at only 1000 R. P. M., which is a low speed as compared with the maximum speeds for which such bearings are adapted, it will be evident that with a six block bearing the laminae of graphitic carbon such as those shown at $e$ and $f$ in Fig. 4 will be subject at the rate of 6000 times per minute to a pumping action which is equivalent in effect to pumping oil into the carbon under a pressure which may be as high as 4500 pounds per square inch, with substantially instantaneous and complete pressure release after every application of pressure. I have found that a graphitic carbon in its usual form will not withstand this pumping action and will sooner or later be either entirely washed out into the lubricant or so loosened that the grains of ferrous constituent at the surface which are embraced between adjacent laminae of carbon become displaced with consequent deterioration of the bearing surface.

As previously pointed out, the maintenance of exact contours of bearing surfaces is a highly important factor in the maintenance of full load carrying capacity of the bearing. In this connection it should also be pointed out that an iron in which the percentage of free ferrite is relatively high is unsuitable, not only because the low Brinell hardness (about 40) of ferrite is too low for proper strength, but also because grains of free ferrite are subject to fracture from the main body of the ring at the bearing surface, thus producing the same effect as that discussed above in connection with Fig. 5.

I have found that all of the desired characteristics with respect to strength of material, machinability, and ability to sustain the conditions of service imposed by use in sliding block bearings, while at the same time providing the desired qualities of hardness and self-lubrication, are met by a cast iron in which the ferrous material is in the form of pearlite having graphite carbon in granular form distributed evenly or substantially evenly throughout the mass of pearlite. Material having different specific analyses may be employed to produce this cast iron, but I have found the most satisfactory to be an iron containing from 2.8 to 3.2% carbon, from 1.4 to 1.6% of silicon from 1.6 to 1.7% of nickel, with phosphorus less than .1% and sulphur less than .15%. Of the total carbon, from 1.9 to 2.1% is in the form of graphitic carbon distributed throughout the pearlite and from .85 to .95% of the carbon is in combined form in the cementitic constituent of the pearlite. Certain methods are known whereby irons of carbon content in the range from 2.8 to 3.3% and with low percentages of silicon may be produced in a form in which the material is substantially of pearlitic structure, but in the known methods heretofore employed the obtaining of the desired form of microstructure is dependent both upon high melting temperatures of the material and low casting temperatures with the use of hot molds. Such methods are, therefore, not applicable on account of the importance of temperatures, which must be modified for different sizes of castings, and the difficulties of obtaining reliable castings are extremely great. Ordinarily, only from 10 to 20% of the castings are in practice found to be fit for use. The structure of the iron with respect to the graphitic content may be improved in certain cases by the addition of alloys such as nickel, chrome, titanium, vanadium, etc., but the addition of such alloys does not materially reduce the difficulties of producing sound castings.

With a material having an analysis of the general character hereinabove specified, the use of centrifugal casting of the material results in the production of a cast iron in which the material is substantially all pearlitic in form and of fine grain and in which the free or graphitic carbon is distributed throughout the pearlitic mass in fine granular particles having substantially even and uniform distribution. Iron of this character produced by centrifugal casting is also substantially uniformly free from structural weaknesses due to formation of blow holes and the like, and the product is equally well suited for castings of widely different sizes. Furthermore, the material will have a hardness well suited for use in conjunction with bearing blocks of a character to be hereinafter described, having a Brinell hardness of from 220 to 280, which hardness I find not to be too great to be entirely satisfactory and which is at the same time above the minimum limit of Brinell hardness of 170 which the bearing material must have if it is to be satisfactory for the purposes of the present invention.

In conjunction with a bearing ring made of material of the character above described, I employ, in the exercise of the present invention, bearing blocks the surfaces of which are of extreme hardness, which surfaces are produced by nitrogen impregnation or "nitriding" of the steel.

For the purpose of making nitrided bearing blocks I have found that a steel having the following analysis

|  | Per cent |
| --- | --- |
| Carbon _____about ___ | .34 |
| Nickel_____do ____ | 1.7 |
| Molybdenum_____do ____ | .27 |
| Manganese_____do ____ | .50–.60 |
| Phosphorus_____do ____ | .022 |
| Sulphur _____do ____ | .007 |
| Aluminum_____do ____ | 1.1 |
| Chromium_____do ____ | 1.6 |
| Silicon _____do ____ | .3 | is satisfactory. Other steels suitable for nitriding may be employed such, for example, as steels not containing molybdenum. Such steels, however, to be suitable for nitriding, are of relatively higher nickel content and, as a consequence, involve difficulties in machining and also the possibility of too great brittleness after annealing. For the purposes of making the bearing block members, the steel is subjected to the nitrogenous atmosphere of ammonia at about 520° C. for from 10 to 100 hours, depending upon the depth of the hardened surface layer that is desired. This will vary with different types and sizes of bearings. The Brinell hardness produced will be from 1000 to 1200 at the surface of the blocks.

I have found from actual experience that with nitrided bearing blocks of the character described and with bearing rings made from cast iron having the characteristics which have been described, sliding block bearings of the character to which the invention relates may be operated for long periods of time and with frequent starting and stopping under load conditions, which bearings make use to a high degree of the theoretical load sustaining capabilities of the bearing without such wear, scoring or other deterioration of the bearing surfaces as to affect to any material extent the capability of the bearing to properly form and maintain the load sustaining films of lubricant between the bearing surfaces.

By the use of nitriding of the blocks to obtain the desired hardness thereof, I am also able to obtain another important advantage in the production of a bearing capable of sustaining a high proportion of the load which it should theoretically sustain, particularly in the case of bearings subjected to both radial and axial thrust loads. By reference to Figs. 1 and 2 it will be apparent that if the bearing is to sustain the maximum axial thrust load, each of the several bearing blocks must be positioned so that under the influence of a thrust load on the shaft 4, for example, in the direction of the arrow in Fig. 1, substantially equal lubricant films are formed between the portions of the spherically curved cooperating sliding surfaces indicated at h in Fig. 1. It will be evident that the formation of equal load sustaining films at the surfaces h depends upon the forming of the side surfaces i of the projections 12 of each of the blocks in exact relationship with respect to the outer surfaces h. Likewise, for maximum thrust absorbing ability in the opposite direction of thrust, the side surfaces i' of the projections 12 of the several blocks must be exactly positioned with respect to the surfaces h'. The exact position of the aforesaid surfaces is also of greatest importance for getting the maximum radial load absorbing ability.

In order to secure the greatest exactitude in the uniformity of these surfaces in all of the blocks in the bearing, I make these blocks by first forming a ring of steel suitable for nitriding and which steel before being nitrided is of a character such as to be readily machinable. I then machine the inner surfaces 10 of the ring to the exact contour and also form to finished dimensions the side surfaces of the inwardly projecting flange which is to form the projections 12 of the several blocks. The outer surface of the ring is machined to approximately the exact dimensions of the desired spherically curved surfaces of the blocks, a small allowance or tolerance being provided for adjustment and polishing after nitriding.

After these surfaces are finished to such dimensions, the ring is cut at peripherally spaced places to form the several blocks. The end recesses 17 of the blocks which are adapted to abut against the projections 11 of the inner ring and against the projections 16 of the aforesaid rings 15 may be formed in any desired manner in the separate blocks. It will be evident from the consideration of Fig. 2 that the same degree of exactitude of dimensions of the recesses at the ends of all the blocks of a set is not required as for the surfaces described above.

Thereafter the blocks are nitrided to provide the necessary hardened surfaces and after the nitriding of the surfaces the blocks only require a slight lapping and polishing to provide finished surfaces as far as the surfaces 10, i and i' are concerned. The spherically curved surfaces of the blocks are then finished off to the desired contour in a jig having a peripheral groove, or formed of parts adapted to contact the sides of the projections, whereby the blocks are held firmly guided in peripheral alignment and prevented from axial movement by the surfaces i and i' of the projections 12. By this procedure I am sure of having exactly the same relationship between the surfaces h, i, h', i' in all of the blocks for the entire bearing.

This method of producing a set of blocks for a bearing which are identical with respect to the essential dimensions can be employed because of the fact that, in hardening the blocks by nitriding, warping of the material or scaling of the surfaces takes place to so small an extent that further machining operations on all surfaces of the blocks to produce finished surfaces of the desired contours and dimensions are not necessary. By producing the blocks in accordance with the above method, the surfaces 10 of the blocks can be made with exact contour and it is only necessary after the nitriding to finish them by a slight lapping and polishing. The small amount of warping occurring can then be wholly eliminated by the polishing of and adjusting operations on the spherically curved surfaces, an allowance of some thousands of an inch being provided for this purpose. By the above method all of the blocks for a given bearing can be made much more uniformly with much simpler operations than is possible when the blocks are individually formed to approximately finished dimensions of all essential surfaces and after hardening are held in a jig or the like for finally finishing operations on all said surfaces.

The ring member 3 providing the surfaces upon which the sliding blocks tilt (in the illustrated embodiment, the inner ring 3) is not subjected to such severe service conditions as the other elements of the bearings since the surfaces which are in load transmitting relation with respect to the blocks are, when the bearing is in operation, in substantially stationary relation with respect to the cooperating surfaces on the blocks.

Generally speaking, it may be said that a properly heat treated alloy steel is satisfactory for the purpose of making this member of the bearing. I prefer to use a suitably hardened chrome nickel steel for this purpose but other high quality alloy steels such as those containing chrome without nickel and steels having manganese and silicon as alloying elements may be employed. The principal requirements of a material for this member are a relatively high degree of hardness coupled with sufficient elasticity to prevent fracturing of the load transmitting surfaces due to brittleness when subjected to high compression stresses. It will, of course, be evident that a material suitable for this ring should be of a nature such as to permit the machining operations necessary to bring the member to the desired dimensions to be performed without difficulty.

While for purposes of illustration of the present invention, I have shown but one type of bearing in more or less diagrammatic form, I believe that the best form of bearing for obtaining the most advantageous results both as to length of life and service and as to maximum load sustaining capacity should incorporate the improvements disclosed in one or more of the following patents or applications, depending upon the type of bearing, some of which disclosures are applicable to both radial and thrust bearings while others of which are applicable to only one of these types, but all of which may be considered as incorporated into disclosures of this application.

Patent No. 1,920,727, issued August 1, 1933;
Patent No. 1,921,957, issued August 8, 1933;
Patent No. 1,921,958, issued August 8, 1933;
Serial No. 639,402, filed October 25, 1932;
Serial No. 666,492, filed April 17, 1933.

What I claim is:

1. A bearing of the sliding block type comprising spaced bearing members and a plurality of bearing blocks operatively position therebetween and adapted to slide relative to one of said members, said one of said members consisting of cast iron having carbon in combined form and in graphitic form in which substantially all of the combined carbon forms a constituent of pearlite and in which the graphitic carbon is in relatively fine granular form substantially evenly distributed in the pearlite, and said blocks comprising nitrided steel.

2. A bearing of the sliding block type comprising spaced bearing members and a plurality of bearing blocks operatively positioned therebetween and adapted to slide relative to one of said members, said one of said members being made of centrifugally cast iron having carbon in combined form and in graphitic form, said iron being substantially entirely in the form of pearlite in which the graphitic carbon is substantially evenly distributed in the form of relatively fine grains, and said blocks comprising nitrided steel.

3. A bearing of the sliding block type comprising spaced bearing members and a plurality of bearing blocks operatively positioned therebetween and adapted to slide relative to one of said members, said one of said members being formed of centrifugally cast iron substantially entirely in the form of pearlite and having a Brinnel hardness of at least 170, said iron containing free graphite in the form of relatively fine grains, substantially evenly distributed in the pearlite, and said blocks comprising nitrided steel.

4. A bearing of the sliding block type comprising spaced bearing members and a plurality of bearing blocks operatively positioned therebetween and adapted to slide relative to one of said members, said one of said members being formed of cast iron having a carbon content within a range the lower limit of which is substantially 2.8% and the upper limit of which is substantially 3.2%, said iron being substantially entirely in the form of pearlite and said carbon content comprising combined carbon forming a constituent of the pearlite and free graphitic carbon distributed substantially evenly in the pearlite in the form of relatively fine grains, and said blocks comprising nitrided steel.

5. A bearing of the sliding block type comprising spaced bearing members and a plurality of bearing blocks operatively positioned therebetween and adapted to slide relative to one of said members, said one of said members being formed of cast iron having a carbon content within a range the lower limit of which is substantially 2.8% and the upper limit of which is substantially 3.2%, said carbon content consisting of combined carbon of from substantially .85% to substantially .95% and the remainder graphitic carbon, said iron being substantially entirely in the form of pearlite having as a constituent thereof said combined carbon and said graphitic carbon being in the form of relatively fine grains substantially evenly distributed in the pearlite, and said blocks comprising nitrided steel.

6. A bearing of the sliding block type comprising spaced bearing members and a plurality of bearing blocks operatively positioned therebetween and adapted to slide relative to one of said members, said blocks comprising nitrided steel and said one of said members being formed of centrifugally cast iron having substantially the following analysis:

| | | Per cent |
|---|---|---|
| Carbon | from | 2.8 to 3.2 |
| Silicon | do | 1.4 to 1.6 |
| Nickel | do | 1.6 to 1.7 |
| Phosphorus | less than | .1 |
| Sulphur | do | .15 | said iron consisting substantially entirely of pearlite containing from between .85 and .95% of said carbon in combined form and the remainder of said carbon being in the form of relatively fine grains of graphite substantially evenly distributed in said pearlite.

7. A bearing of the sliding block type comprising spaced bearing members and a plurality of bearing blocks operatively positioned therebetween, said bearing blocks being adapted to slide relative to one of said members and being adapted to tilt relative to the other of said members, said one of said members consisting of centrifugally cast iron having carbon in combined form and in graphitic form in which substantially all of the combined carbon forms a constituent of pearlite and in which the graphitic carbon is in relatively fine granular form substantially evenly distributed in the pearlite, said blocks comprising nitrided steel and said other of said members comprising steel.

AUGUST GUNNAR FERDINAND WALLGREN.